United States Patent
Ichikawa et al.

(10) Patent No.: US 9,181,355 B2
(45) Date of Patent: *Nov. 10, 2015

(54) MODIFIED NATURAL RUBBER, METHOD FOR PRODUCING SAME, RUBBER COMPOSITION, AND PNEUMATIC TIRE

(75) Inventors: Naoya Ichikawa, Kobe (JP); Toshiaki Sakaki, Kobe (JP); Lucksanaporn Tarachiwin, Nakhon Pathom (TH); Kamalin Kanyawararak, Nakhon Pathom (TH)

(73) Assignee: SUMITOMO RUBBER INDUSTRIES, LTD., Kobe-shi (JP)

(*) Notice: Subject to any disclaimer, the term of this patent is extended or adjusted under 35 U.S.C. 154(b) by 16 days.

This patent is subject to a terminal disclaimer.

(21) Appl. No.: 13/699,533

(22) PCT Filed: Jun. 9, 2011

(86) PCT No.: PCT/JP2011/063248
§ 371 (c)(1),
(2), (4) Date: Nov. 21, 2012

(87) PCT Pub. No.: WO2011/155561
PCT Pub. Date: Dec. 15, 2011

(65) Prior Publication Data
US 2013/0066021 A1 Mar. 14, 2013

(30) Foreign Application Priority Data

Jun. 10, 2010 (JP) ................ 2010-133093
Jun. 10, 2010 (JP) ................ 2010-133094

(51) Int. Cl.
| | | |
|---|---|---|
| C08C 3/02 | (2006.01) | |
| C08C 4/00 | (2006.01) | |
| C08C 1/04 | (2006.01) | |
| B60C 1/00 | (2006.01) | |
| C08L 15/00 | (2006.01) | |

(52) U.S. Cl.
CPC ............. C08C 1/04 (2013.01); B60C 1/0016 (2013.04); B60C 1/0025 (2013.04); C08C 3/02 (2013.01); C08L 15/00 (2013.01); *C08J 2307/02* (2013.01); *Y02T 10/862* (2013.01)

(58) Field of Classification Search
CPC ............. C08C 3/02; C08C 1/04; C08C 1/14; C08C 1/15; C08C 4/00; C08J 2307/02; B60C 1/0016; B60C 1/0025; C08F 36/08; C08F 136/08
USPC ................ 525/333.1, 367, 369, 383
See application file for complete search history.

(56) References Cited

U.S. PATENT DOCUMENTS

| | | |
|---|---|---|
| 2,140,527 A | 12/1938 | Haynes et al. |
| 2,486,720 A | 11/1949 | Perkerson |
| 2,650,891 A | 9/1953 | Buckwalter |
| 2,905,567 A | 9/1959 | Allen |
| 3,709,845 A | 1/1973 | Boustany et al. |
| 3,716,513 A | 2/1973 | Burke, Jr. |
| 3,959,194 A | 5/1976 | Adelmann |
| 4,508,860 A | 4/1985 | Hawes |
| 4,835,216 A | 5/1989 | Morikawa et al. |
| 5,000,092 A | 3/1991 | Best |
| 5,017,636 A | 5/1991 | Hattori et al. |
| 5,290,830 A | 3/1994 | Tung et al. |
| 5,396,940 A | 3/1995 | Segatta et al. |
| 5,569,740 A | 10/1996 | Tanaka et al. |
| 5,908,893 A | 6/1999 | Kawasaki et al. |
| 5,967,211 A | 10/1999 | Lucas et al. |
| 6,117,545 A | 9/2000 | Cavaille et al. |
| 6,306,955 B1 * | 10/2001 | Kawasaki et al. ......... 524/575.5 |
| 6,376,587 B1 | 4/2002 | Ajiro et al. |
| 6,489,389 B1 | 12/2002 | Ohta et al. |
| 6,703,497 B1 | 3/2004 | Ladouce et al. |
| 7,427,646 B2 | 9/2008 | Kondou |
| 8,022,136 B2 | 9/2011 | Yano et al. |
| 8,163,821 B2 * | 4/2012 | Hiro .............................. 524/115 |

(Continued)

FOREIGN PATENT DOCUMENTS

| | | |
|---|---|---|
| CN | 1572825 A | 2/2005 |
| CN | 1692128 A | 11/2005 |

(Continued)

OTHER PUBLICATIONS

International Search Report, dated Sep. 13, 2011, issued in PCT/JP2011/063248.
Database WPI Week 200570 Thomson Scientific, London, GB; AN 2005-684076 (XP-002673748).
International Search Report, PCT/JP2009/070824, Mar. 9, 2010.
Machine generated English translation of JP-2006-152171-A, dated Jun. 15, 2006.
Machine generated English translation of JP-2006-307018-A, dated Nov. 9, 2006.
Machine generated English translation of JP-2008-106099-A, dated May 8, 2008.
Machine generated English translation of JP-6-329702-A, dated Nov. 29, 1994.
Rhodia Silcea press release, Feb. 27, 2007.
U.S. Notice of Allowance dated Sep. 9, 2013 for copending U.S. Appl. No. 13/117,182.

(Continued)

*Primary Examiner* — Roberto Rabago
(74) *Attorney, Agent, or Firm* — Birch Stewart Kolasch & Birch, LLP

(57) ABSTRACT

The present invention provides a modified natural rubber having a reduced tan δ, a method for producing the modified natural rubber, a rubber composition produced using the modified natural rubber, and a pneumatic tire produced using the rubber composition. The present invention also provides a modified natural rubber having a reduced tan δ, a method for producing the modified natural rubber, a rubber composition produced using the modified natural rubber and achieving good fuel economy and abrasion resistance at the same time, and a pneumatic tire produced using the rubber composition. The present invention relates to a modified natural rubber having a phosphorus content of 200 ppm or less and a total content of sodium and potassium of 350 ppm or less. The invention also relates to a modified natural rubber having a phosphorus content of 200 ppm or less and a nitrogen content of 0.2% by mass or less.

16 Claims, No Drawings

(56) References Cited

U.S. PATENT DOCUMENTS

| | | | |
|---|---|---|---|
| 8,273,804 B2* | 9/2012 | Nishimura | 523/155 |
| 8,623,956 B2* | 1/2014 | Sugimoto et al. | 524/547 |
| 8,633,275 B2* | 1/2014 | Sakaki et al. | 524/572 |
| 8,658,728 B2* | 2/2014 | Ichikawa et al. | 524/495 |
| 8,658,730 B2* | 2/2014 | Ichikawa | 524/495 |
| 8,809,450 B2* | 8/2014 | Sakaki et al. | 524/572 |
| 8,813,798 B2* | 8/2014 | Tsumori et al. | 152/152 |
| 8,857,482 B2* | 10/2014 | Taguchi et al. | 152/151 |
| 8,875,765 B2* | 11/2014 | Tsumori et al. | 152/541 |
| 2003/0060551 A1 | 3/2003 | Mizuno et al. | |
| 2003/0083516 A1 | 5/2003 | Korth et al. | |
| 2004/0110889 A1 | 6/2004 | Yagi et al. | |
| 2004/0266937 A1 | 12/2004 | Yagi et al. | |
| 2005/0027060 A1 | 2/2005 | Yagi et al. | |
| 2005/0148723 A1 | 7/2005 | Kondou | |
| 2005/0234186 A1 | 10/2005 | Kondou | |
| 2006/0252879 A1* | 11/2006 | Tanaka et al. | 524/571 |
| 2007/0059232 A1 | 3/2007 | Stenzel et al. | |
| 2007/0100061 A1 | 5/2007 | Hattori et al. | |
| 2007/0197688 A1 | 8/2007 | Tsukada et al. | |
| 2007/0241480 A1 | 10/2007 | Kanenari et al. | |
| 2008/0009570 A1 | 1/2008 | Miyazaki | |
| 2008/0185087 A1* | 8/2008 | Galimberti et al. | 152/510 |
| 2009/0000721 A1 | 1/2009 | Imoto et al. | |
| 2009/0088496 A1 | 4/2009 | Miyasaka et al. | |
| 2009/0099281 A1 | 4/2009 | Sakurai et al. | |
| 2010/0076118 A1 | 3/2010 | Yano et al. | |
| 2010/0206444 A1 | 8/2010 | Kawasaki | |
| 2010/0294407 A1 | 11/2010 | Kushida | |
| 2011/0094648 A1 | 4/2011 | Horiguchi | |
| 2011/0094649 A1 | 4/2011 | Miyazaki | |
| 2011/0136939 A1 | 6/2011 | Lechtenboehmer et al. | |
| 2011/0166254 A1 | 7/2011 | Nishimura | |
| 2011/0172339 A1 | 7/2011 | Satou | |
| 2011/0178235 A1 | 7/2011 | Sugimoto | |
| 2011/0184118 A1 | 7/2011 | Sugimoto et al. | |
| 2011/0230613 A1 | 9/2011 | Hiro | |
| 2011/0253285 A1* | 10/2011 | Ichikawa et al. | 152/564 |
| 2011/0294949 A1 | 12/2011 | Sakaki et al. | |
| 2012/0214911 A1 | 8/2012 | Yano et al. | |
| 2013/0030083 A1 | 1/2013 | Taguchi et al. | |
| 2013/0066021 A1 | 3/2013 | Ichikawa et al. | |
| 2013/0098523 A1 | 4/2013 | Tsumori et al. | |
| 2013/0102722 A1 | 4/2013 | Tsumori et al. | |
| 2013/0123387 A1 | 5/2013 | Kagawa et al. | |

FOREIGN PATENT DOCUMENTS

| | | |
|---|---|---|
| CN | 1946744 A | 4/2007 |
| CN | 101270219 A | 9/2008 |
| CS | 237729 B1 | 10/1985 |
| EP | 0328261 A1 | 8/1989 |
| EP | 0905186 A1 | 3/1999 |
| EP | 2000-344955 A | 12/2000 |
| EP | 1 484 359 A1 | 12/2004 |
| EP | 1 568 713 A1 | 8/2005 |
| EP | 1650253 A1 | 4/2006 |
| EP | 1 652 862 A1 | 5/2006 |
| EP | 1 816 144 A1 | 8/2007 |
| EP | 2072574 A1 | 6/2009 |
| EP | 2 154 192 A1 | 2/2010 |
| EP | 2223928 A1 | 9/2010 |
| EP | 2284022 A1 | 2/2011 |
| EP | 2333008 A1 | 6/2011 |
| EP | 2333009 A1 | 6/2011 |
| EP | 2366558 A1 | 9/2011 |
| EP | 2 377 892 A1 | 10/2011 |
| EP | 2 476 708 A1 | 7/2012 |
| EP | 2615127 A2 | 7/2013 |
| GB | 164392 A | 6/1921 |
| GB | 240939 A | 10/1925 |
| JP | 4-356205 A | 12/1992 |
| JP | 5-301994 A | 11/1993 |
| JP | 6-87306 A | 3/1994 |
| JP | 6-329702 A | 11/1994 |
| JP | 6-329838 A | 11/1994 |
| JP | 7-149955 A | 6/1995 |
| JP | 07-196850 A | 8/1995 |
| JP | 8-12814 A | 1/1996 |
| JP | 8-143606 A | 6/1996 |
| JP | 11-12306 A | 1/1999 |
| JP | 11-78437 A | 3/1999 |
| JP | 11-129711 A | 5/1999 |
| JP | 11-222012 A | 8/1999 |
| JP | 11-513425 A | 11/1999 |
| JP | 2000-95898 A | 4/2000 |
| JP | 2001-114939 A | 4/2001 |
| JP | 2002-503621 A | 2/2002 |
| JP | 2002-155164 A | 5/2002 |
| JP | 3294901 B2 | 6/2002 |
| JP | 2002-524618 A | 8/2002 |
| JP | 2002-338734 A | 11/2002 |
| JP | 2003-64221 A | 3/2003 |
| JP | 2003-94918 A | 4/2003 |
| JP | 2003-320804 A | 11/2003 |
| JP | 2004-59803 A | 2/2004 |
| JP | 2004-67027 A | 3/2004 |
| JP | 2004-91715 A | 3/2004 |
| JP | 2004-182905 A | 7/2004 |
| JP | 2004-250546 A | 9/2004 |
| JP | 2004-262973 A | 9/2004 |
| JP | 2004-359773 A | 12/2004 |
| JP | 2005-41960 A | 2/2005 |
| JP | 2005-68240 A | 3/2005 |
| JP | 2005-75856 A | 3/2005 |
| JP | 2005-82622 A | 3/2005 |
| JP | 2005-82766 A | 3/2005 |
| JP | 2005-126604 A | 5/2005 |
| JP | 2005-133025 A | 5/2005 |
| JP | 2005-325206 A | 11/2005 |
| JP | 2005-325307 A | 11/2005 |
| JP | 2006-16622 A | 1/2006 |
| JP | 2006-36926 A | 2/2006 |
| JP | 2006-96926 A | 4/2006 |
| JP | 2006-104455 A | 4/2006 |
| JP | 2006-152045 A | 6/2006 |
| JP | 2006-152171 A | 6/2006 |
| JP | 2006-152211 | 6/2006 |
| JP | 2006-206837 A | 8/2006 |
| JP | 2006-206864 A | 8/2006 |
| JP | 2006-281744 A | 10/2006 |
| JP | 2006-307018 A | 11/2006 |
| JP | 2007-131730 A | 5/2007 |
| JP | 2007-145898 A | 6/2007 |
| JP | 2007-169431 A | 7/2007 |
| JP | 2008-106099 A | 5/2008 |
| JP | 2008-156446 A | 7/2008 |
| JP | 2008-214608 A | 9/2008 |
| JP | 2008-308615 A | 12/2008 |
| JP | 2009-1680 A | 1/2009 |
| JP | 2009-13196 A | 1/2009 |
| JP | 2009-13197 A | 1/2009 |
| JP | 2009-51955 A | 3/2009 |
| JP | 2009-67929 A | 4/2009 |
| JP | 2009-84564 A | 4/2009 |
| JP | 2009-108308 A | 5/2009 |
| JP | 2009-191132 A | 8/2009 |
| JP | 2009-191198 A | 8/2009 |
| JP | 2009-202865 A | 9/2009 |
| JP | 2009-262835 A | 11/2009 |
| JP | 2010-70747 A | 4/2010 |
| JP | 2010-111785 A | 5/2010 |
| JP | 2010-138359 A | 6/2010 |
| JP | 2010-144001 A | 7/2010 |
| JP | 2010-173513 A | 8/2010 |
| JP | 2010-174169 A | 8/2010 |
| JP | 2010-242023 A | 10/2010 |
| JP | 2010-248282 A | 11/2010 |
| JP | 4581116 B2 | 11/2010 |
| JP | 2010-275642 A | 12/2010 |
| JP | 2011-63651 A | 3/2011 |
| JP | 2011-153221 A | 8/2011 |
| JP | 2011-153222 A | 8/2011 |

(56) References Cited

FOREIGN PATENT DOCUMENTS

| JP | 2011-157473 | A | | 8/2011 |
|---|---|---|---|---|
| JP | 2011-225680 | A | | 11/2011 |
| JP | 2011-231214 | A | | 11/2011 |
| JP | 2011-256311 | A | | 12/2011 |
| JP | 2012-1571 | A | | 1/2012 |
| WO | WO 03/082925 | A1 | | 10/2003 |
| WO | WO 2005/012365 | A1 | | 2/2005 |
| WO | WO 2005/092971 | A1 | | 10/2005 |
| WO | WO 2009/096113 | A1 | | 8/2009 |
| WO | WO 2010/071106 | A1 | | 6/2010 |
| WO | WO 2010/071106 | A1 | * | 6/2010 |
| WO | WO 2011/049162 | A1 | | 4/2011 |
| WO | WO 2011/096399 | A1 | | 8/2011 |

OTHER PUBLICATIONS

U.S. Office Action dated Jun. 13, 2014 for copending U.S. Appl. No. 13/672,880.
U.S. Office Action dated Mar. 4, 2014 for U.S. Appl. No. 13/560,090.
U.S. Office Action dated Nov. 4, 2013 for U.S. Appl. No. 13/616,310.
U.S. Office Action dated Sep. 13, 2013 for copending U.S. Appl. No. 13/672,880.
United States Office Action for copending U.S. Appl. No. 13/006,606 dated May 9, 2013.
United States Office Action for copending U.S. Appl. No. 13/006,606 dated Oct. 10, 2012.
United States Office Action for copending U.S. Appl. No. 13/013,849 dated Mar. 13, 2013.
United States Office Action for copending U.S. Appl. No. 13/117,182 dated May 17, 2013.
US Notice of Allowance for U.S. Appl. No. 12/983,338 dated Feb. 14, 2012.
US Notice of Allowance for U.S. Appl. No. 13/013,849 dated Aug. 28, 2013.
US Notice of Allowance for U.S. Appl. No. 13/048,914 dated Feb. 1, 2012.
US Notice of Allowance for U.S. Appl. No. 13/560,090 dated Jun. 17, 2014.
US Office Action for copending U.S. Appl. No. 13/117,182, dated Feb. 5, 2013.
US Office Action for copending U.S. Appl. No. 13/672,880, dated Mar. 28, 2013.
US Office Action for U.S. Appl. No. 12/983,338 dated Mar. 23, 2011.
US Office Action for U.S. Appl. No. 12/983,338 dated Sep. 15, 2011.
US Office Action for U.S. Appl. No. 13/048,914 dated Sep. 19, 2011.
US Office Action for U.S. Appl. No. 13/560,090 dated Aug. 2, 2013.
US Office Action for U.S. Appl. No. 13/560,090 dated Nov. 12, 2013.
US Office Action for U.S. Appl. No. 13/616,310 dated May 7, 2014.
"Shinpan Kobunshi Jiten" (Polymer Dictionary, New Edition), 6th Imp., published Mar. 20, 2001, p. 448, with partial translation of lines 21-30 of the left column of p. 448 (3 pages total).
Extended European Search Report, dated Aug. 27, 2010, for European Application No. 08830800.2.
Food Chemicals Codex, 7th Edition, Calcium Lignosulfonate, p. 142, 2010.
The Chemical Society of Japan, "Hyojun Kagaku Yogo Jiten" (Standard Dictionary of Chemical Terms), 2nd Ed., published Mar. 31, 2005, pp. 672-673, with partial translation of lines 5-9 of the left column of p. 673 (3 pages total).
Tokai Carbon Co., Ltd., "SEAST SO (FEF)", Physicochemical Properties, Product Information, retrieved Feb. 20, 2014, 3 pages, http://www.tokaicarbon.co.jp/en/products/carbon_b/seast/.
U.S. Notice of Allowance for U.S. Appl. No. 13/006,606, dated Oct. 7, 2014.
U.S. Notice of Allowance for U.S. Appl. No. 13/139,536, dated Dec. 4, 2013 (Supplemental Notice of Allowability).
U.S. Notice of Allowance for U.S. Appl. No. 13/139,536, dated Oct. 18, 2013.
U.S. Notice of Allowance for U.S. Appl. No. 13/350,407, dated Apr. 23, 2014.
U.S. Notice of Allowance for U.S. Appl. No. 13/616,310, dated Aug. 27, 2014.
U.S. Notice of Allowance for U.S. Appl. No. 13/616,310, dated Oct. 1, 2014 (Corrected Notice of Allowability).
U.S. Notice of Allowance for U.S. Appl. No. 13/776,126, dated Dec. 26, 2013.
U.S. Notice of Allowance for U.S. Appl. No. 14/013,286, dated Dec. 29, 2014.
U.S. Office Action for U.S. Appl. No. 13/139,536, dated Jan. 27, 2012.
U.S. Office Action for U.S. Appl. No. 13/139,536, dated Jul. 10, 2013.
U.S. Office Action for U.S. Appl. No. 13/139,536, dated Jun. 29, 2012.
U.S. Office Action for U.S. Appl. No. 13/139,536, dated Mar. 14, 2013.
U.S. Office Action for U.S. Appl. No. 13/139,536, dated Oct. 12, 2012.
U.S. Office Action for U.S. Appl. No. 13/139,536, dated Oct. 27, 2011.
U.S. Office Action for U.S. Appl. No. 13/350,407, dated Jan. 17, 2013.
U.S. Office Action for U.S. Appl. No. 13/350,407, dated May 23, 2013.
U.S. Office Action for U.S. Appl. No. 13/350,407, dated Oct. 23, 2013.
U.S. Office Action for U.S. Appl. No. 13/739,796, dated Feb. 27, 2014.
U.S. Office Action for U.S. Appl. No. 13/739,796, dated Jan. 28, 2015.
U.S. Office Action for U.S. Appl. No. 13/739,796, dated Jul. 11, 2014.
U.S. Office Action for U.S. Appl. No. 13/739,796, dated Sep. 24, 2014.
U.S. Office Action for U.S. Appl. No. 13/748,168, dated Aug. 1, 2014.
U.S. Office Action for U.S. Appl. No. 13/748,168, dated May 7, 2014.
U.S. Office Action for U.S. Appl. No. 13/748,168, dated Nov. 6, 2014.
U.S. Office Action for U.S. Appl. No. 13/752,507, dated Aug. 14, 2014.
U.S. Office Action for U.S. Appl. No. 13/752,507, dated Dec. 17, 2014.
U.S. Office Action for U.S. Appl. No. 13/752,507, dated Jan. 29, 2015.
U.S. Office Action for U.S. Appl. No. 13/752,507, dated Mar. 14, 2014.
U.S. Office Action for U.S. Appl. No. 13/752,711, dated Dec. 26, 2014.
U.S. Office Action for U.S. Appl. No. 13/752,711, dated Jun. 5, 2014.
U.S. Office Action for U.S. Appl. No. 13/752,711, dated Mar. 17, 2014.
U.S. Office Action for U.S. Appl. No. 13/752,711, dated Sep. 18, 2014.
U.S. Office Action for U.S. Appl. No. 13/776,126, dated May 23, 2013.
U.S. Office Action for U.S. Appl. No. 13/777,627, dated Jan. 30, 2015.
U.S. Office Action for U.S. Appl. No. 13/777,627, dated Jul. 1, 2014.
U.S. Office Action for U.S. Appl. No. 14/013,286, dated Aug. 6, 2014.
U.S. Office Action for U.S. Appl. No. 14/107,614, dated Oct. 31, 2014.
Office Action, dated Feb. 23, 2015, issued in U.S. Appl. No. 13/752,711.

* cited by examiner

MODIFIED NATURAL RUBBER, METHOD FOR PRODUCING SAME, RUBBER COMPOSITION, AND PNEUMATIC TIRE

TECHNICAL FIELD

The present invention relates to a modified natural rubber, a method for producing the modified natural rubber, a rubber composition produced using the modified natural rubber, and a pneumatic tire produced using the rubber composition.

BACKGROUND ART

Natural rubber is used in various fields, including industrial products such as tires, belts and rolls, and sports products such as tennis balls. Rubber products are generally subjected to compression-recovery-elongation repeatedly during use, which results in accumulation of loss energy to generate heat. This heat promotes rubber fatigue and thus contributes to shortened life of the rubber products. The larger the amount of the loss energy represented by loss tangent, tan $\delta$, is, the more the heat build-up is. Further, the rolling resistance of a tire is empirically known to be dependent on the value of tan $\delta$ at 50° C. to 70° C. This means that there are problems that a high tan $\delta$ causes an increase not only in heat build-up but also in rolling resistance, and therefore causes a decrease in fuel economy of vehicles. Accordingly, it is desirable for treads of fuel-saving tires to have a low tan $\delta$ at 50° C. to 70° C.

Some documents disclose methods for reducing the protein and gel contents in natural rubber to reduce the tan $\delta$ of a rubber composition. For example, Patent Literature 1 discloses a method of immersing solid natural rubber swollen with a solvent in an alkali hydroxide solution. Patent Literature 2 discloses a method of removing magnesium phosphate from natural rubber latex by adding a phosphate to the latex. Patent Literature 3 discloses a method of adding a proteolytic enzyme and a surfactant to natural rubber latex and aging the latex. Patent Literature 4 discloses a method of adding a surfactant to natural rubber latex and performing a washing treatment.

However, these methods can reduce the protein and gel contents to some extent, but not yet to a sufficient level. In general, deproteinization can reduce the protein content, but disadvantageously it cannot sufficiently remove, particularly, phospholipids which are thought to be one of the factors for formation of a gel fraction in natural rubber.

In addition, these methods can reduce the protein and gel contents to some extent, but not yet to a sufficient level, and further reduction in tan $\delta$ is thus desired. Tires are also especially desired to have durability such as abrasion resistance, and it is commonly hard to achieve good fuel economy and durability at the same time.

CITATION LIST

Patent Literature

Patent Literature 1: JP-A H11-12306
Patent Literature 2: JP-A 2004-250546
Patent Literature 3: JP-A 2005-82622
Patent Literature 4: JP-A H06-329838

SUMMARY OF INVENTION

Technical Problem

A first aspect of the present invention aims to provide a modified natural rubber that solves the above problems and has a reduced tan $\delta$, a method for producing the modified natural rubber, a rubber composition produced using the modified natural rubber, and a pneumatic tire produced using the rubber composition.

Moreover, a second aspect of the present invention aims to provide a modified natural rubber that solves the above problems and has a reduced tan $\delta$, a method for producing the modified natural rubber, a rubber composition produced using the modified natural rubber and achieving good fuel economy and abrasion resistance at the same time, and a pneumatic tire produced using the rubber composition.

Solution to Problem

The present inventors have found out the following facts to complete the first aspect of the present invention. That is, saponification of natural rubber latex with an alkali (e.g. sodium hydroxide, potassium hydroxide) followed by washing can reduce not only the protein content but also the gel and phospholipid contents, thereby leading to reduction in tan $\delta$. Then, reduction of the (residual) contents of sodium and potassium derived from the alkali used in saponification leads to further reduction in tan $\delta$.

Namely, the first aspect of the present invention relates to a modified natural rubber having a phosphorus content of 200 ppm or less and a total content of sodium and potassium of 350 ppm or less.

The modified natural rubber preferably has a nitrogen content of 0.3% by mass or less and a gel content of 20% by mass or less, the gel content being determined as an amount of toluene-insoluble matter.

The modified natural rubber is preferably produced by a method including the steps of: saponifying natural rubber latex with an alkali; and washing the resulting rubber until the phosphorus content falls to 200 ppm or less and the total content of sodium and potassium falls to 350 ppm or less.

The first aspect of the present invention also relates to a method for producing a modified natural rubber, including the steps of: saponifying natural rubber latex with an alkali; and washing the resulting rubber until the phosphorus content falls to 200 ppm or less and the total content of sodium and potassium falls to 350 ppm or less.

The first aspect of the present invention also relates to a rubber composition containing the modified natural rubber and a vulcanizing agent.

The first aspect of the present invention also relates to a pneumatic tire produced using the rubber composition.

The present inventors also have found out that saponification of natural rubber latex with an alkali (e.g. sodium hydroxide, potassium hydroxide) can reduce not only the protein content but also the gel and phospholipid contents, thereby leading to reduction in tan $\delta$. As a result of further investigations, they have found out the following facts to complete the second aspect of the present invention. That is, treatment of the saponified rubber with an alkali metal carbonate in addition to the saponification can greatly reduce the nitrogen content which indicates the amount of proteins, so that the value of tan $\delta$ is further reduced.

Namely, the second aspect of the present invention relates to a modified natural rubber having a phosphorus content of 200 ppm or less and a nitrogen content of 0.2% by mass or less.

The modified natural rubber preferably has a nitrogen content of 0.1% by mass or less.

The modified natural rubber preferably has a gel content of 20% by mass or less, the gel content being determined as an amount of toluene-insoluble matter.

Preferably, the modified natural rubber shows no phospholipid peak between −3 ppm and 1 ppm in a $^{31}$P-NMR measurement of a chloroform extract thereof and thus contains substantially no phospholipids.

The modified natural rubber is preferably produced by a method including the steps of: saponifying natural rubber latex with an alkali; adjusting pH of the saponified natural rubber latex; treating the rubber resulting from the pH adjustment, with an alkali metal carbonate; and washing the treated rubber.

The second aspect of the present invention also relates to a method for producing a modified natural rubber, including the steps of: saponifying natural rubber latex with an alkali; adjusting pH of the saponified natural rubber latex; treating the rubber resulting from the pH adjustment, with an alkali metal carbonate; and washing the treated rubber.

The second aspect of the present invention also relates to a rubber composition containing the modified natural rubber and a vulcanizing agent.

The second aspect of the present invention also relates to a pneumatic tire produced using the rubber composition.

Advantageous Effects of Invention

According to the first aspect of the present invention, the modified natural rubber has a phosphorus content of not more than a specific value and a total content of sodium and potassium of not more than a predetermined value. The modified natural rubber therefore has a reduced tan δ, and enables to provide a rubber composition having a reduced tan δ and a pneumatic tire excellent in fuel economy.

According to the second aspect of the present invention, the modified natural rubber has a phosphorus content of not more than a specific value and a nitrogen content of not more than a predetermined value. The modified natural rubber therefore has a reduced tan δ, and enables to provide a rubber composition having a reduced tan δ (excellent fuel economy) and excellent abrasion resistance, and a pneumatic tire excellent in fuel economy and abrasion resistance.

DESCRIPTION OF EMBODIMENTS

First Aspect of the Present Invention (Modified Natural Rubber)

The modified natural rubber (HPNR) of the first aspect of the present invention has a phosphorus content of not more than a specific value and a total content of sodium and potassium of not more than a predetermined value.

In the first aspect of the present invention, natural rubber latex is saponified with an alkali (e.g. sodium hydroxide, potassium hydroxide) and then washed, so that the protein, gel, and phospholipid contents are reduced. As a result, the value of tan δ can be reduced. In the washing treatment, sufficient removal of sodium and potassium derived from the alkali used in saponification further reduces the value of tan δ. The modified natural rubber (HPNR) of the first aspect of the present invention therefore has a greatly reduced tan δ and is excellent in reducing the heat build-up and rolling resistance. Owing to the reduction of the protein, gel, and phospholipid contents, the modified natural rubber has a low Mooney viscosity and excellent processability. The modified natural rubber of the first aspect of the present invention is also more excellent in abrasion resistance compared with ordinary natural rubber (e.g. TSR).

In the modified natural rubber (HPNR) of the first aspect of the present invention, a correlation is found between tan δ and the total content of sodium and potassium. In the case of another rubber component (e.g. isoprene rubber, butadiene rubber), on the other hand, no correlation is found between tan δ and the total content of sodium and potassium. Accordingly, the modified natural rubber (HPNR) of the present invention has a characteristic effect in that its reduced total content of sodium and potassium results in reduction in tan δ.

The modified natural rubber (HPNR) of the first aspect of the present invention has a phosphorus content of 200 ppm or less. The phosphorus content of more than 200 ppm is likely to fail to lead to a sufficient reduction in tan δ. The phosphorus content is preferably 150 ppm or less, and more preferably 100 ppm or less. Here, the phosphorus content can be measured by a conventional method such as ICP optical emission spectrometry. The phosphorus is derived from phospholipids (phosphorus compounds).

The modified natural rubber of the first aspect of the present invention has a total content of sodium and potassium of 350 ppm or less. The total content of sodium and potassium of more than 350 ppm is likely to fail to lead to a sufficient reduction in tan δ. The total content of sodium and potassium is preferably 300 ppm or less, more preferably 250 ppm or less, and still more preferably 200 ppm or less.

Here, the total content of sodium and potassium can be determined by measuring the sodium content and the potassium content by a conventional method such as ICP optical emission spectrometry and then summing up the results.

The modified natural rubber of the first aspect of the present invention preferably has a gel content of 20% by mass or less, more preferably 15% by mass or less, and still more preferably 10% by mass or less. The gel content of more than 20% by mass tends to result in lower processability such as increased Mooney viscosity and to fail to lead to a sufficient reduction in tan δ. The gel content refers to an amount determined as matter insoluble in toluene that is a non-polar solvent. Hereinafter, such a content is also referred to simply as the "gel content" or "gel fraction". The content of a gel fraction is determined by the following determination method. First, a natural rubber sample is immersed in dehydrated toluene and left for one week in a dark place protected from light. Next, the toluene solution is centrifuged for 30 minutes at $1.3 \times 10^5$ rpm so that a toluene-insoluble gel fraction and a toluene-soluble fraction are separated from each other. The toluene-insoluble gel fraction is mixed with methanol to be solidified, and is then dried. Finally, the gel content can be determined from the ratio of the mass of the dried gel fraction and the original mass of the sample.

The modified natural rubber of the first aspect of the present invention preferably contains substantially no phospholipids. Here, "containing substantially no phospholipids" means that a natural rubber sample shows no phospholipid peak between −3 ppm and 1 ppm in the $^{31}$P-NMR measurement of an extract prepared by chloroform extraction from the sample. The phosphorus peak between −3 ppm and 1 ppm refers to a peak corresponding to the phosphate ester structure of the phosphorus component in phospholipids.

The modified natural rubber of the first aspect of the present invention preferably has a nitrogen content of 0.3% by mass or less, more preferably 0.2% by mass or less, and still more preferably 0.1% by mass or less. The nitrogen content of more than 0.3% by mass tends to result in an increase in Mooney viscosity during storage, and to fail to lead to a sufficient reduction in tan δ. The nitrogen is derived from proteins. The nitrogen content can be measured by a conventional method such as the Kjeldahl method.

Exemplary methods for producing the modified natural rubber of the first aspect of the present invention include the following methods 1 and 2.

(Method 1)

A method including the steps of: saponifying natural rubber latex with an alkali; adjusting pH of the saponified natural rubber latex; crushing the agglomerated rubber resulting from the pH adjustment; and washing the crushed rubber until the phosphorus content and the total content of sodium and potassium fall to not more than the respective predetermined values.

(Method 2)

A method including the steps of: saponifying natural rubber latex with an alkali; adjusting pH of the saponified natural rubber latex; agglomerating rubber particles by a polymer flocculant after the pH adjustment; and washing the agglomerated rubber until the phosphorus content and the total content of sodium and potassium fall to not more than the respective predetermined values.

In each of the above methods, phosphorous compounds separated by saponification are removed by washing, so that the modified natural rubber is allowed to have a lowered phosphorus content, thereby leading to reduction in tan δ. The saponification also decomposes proteins in the natural rubber latex, so that the modified natural rubber is allowed to have a lowered nitrogen content, thereby leading to further reduction in tan δ. In addition, washing until the total content of sodium and potassium in rubber falls to not more than a predetermined value sufficiently removes sodium and potassium derived from the alkali used in the saponification, resulting in further reduction in tan δ.

In Methods 1 and 2, the saponification is performed by adding an alkali and optionally a surfactant to natural rubber latex and allowing the mixture to stand still for a certain period at a predetermined temperature. Here, the mixture may optionally be stirred or subjected to other operations. In the first aspect of the present invention, the saponification is performed by adding an alkali to natural rubber latex, and the addition of an alkali to natural rubber latex contributes to efficient saponification.

Natural rubber latex is sap collected from hevea trees and contains components such as water, proteins, lipids, and inorganic salts as well as a rubber fraction. A gel fraction in rubber is thought to be derived from a complex of various impurities in rubber. The latex used in the first aspect of the present invention may be raw latex taken from hevea trees by tapping the trees, or purified latex concentrated by centrifugation. Alternatively, high ammonia latex may be used which is produced by adding ammonia to raw rubber latex by a common method so as to inhibit the corruption of raw rubber latex due to bacteria existing in the latex and to prevent coagulation of the latex.

Suitable examples of the alkali used in saponification include sodium hydroxide and potassium hydroxide in terms of the saponification effects and the influence on the stability of natural rubber latex. In these cases, the total content of sodium and potassium can be adjusted to not more than a predetermined value by pH adjustment, crushing of the agglomerated rubber, and washing of the crushed rubber in Method 1, or by pH adjustment, rubber agglomeration by a polymer flocculant, and washing of the agglomerated rubber in Method 2.

The addition amount of the alkali is not particularly limited. The minimum addition amount of the alkali is preferably 0.1 parts by mass or more, and more preferably 0.3 parts by mass or more for each 100 parts by mass of the solids in natural rubber latex. The maximum addition amount of the alkali is preferably 12 parts by mass or less, more preferably 10 parts by mass or less, and still more preferably 7 parts by mass or less for each 100 parts by mass of the solids in natural rubber latex. The addition amount of the alkali of less than 0.1 parts by mass may require a long time for saponification. Conversely, the addition amount of the alkali of more than 12 parts by mass may destabilize natural rubber latex.

Anionic surfactants, nonionic surfactants, and amphoteric surfactants are usable as the surfactant. Examples of the anionic surfactants include carboxylic acid anionic surfactants, sulfonic acid anionic surfactants, sulfate anionic surfactants, and phosphate anionic surfactants. Examples of the nonionic surfactants include polyoxyalkylene ether nonionic surfactants, polyoxyalkylene ester nonionic surfactants, polyhydric alcohol fatty acid ester nonionic surfactants, sugar fatty acid ester nonionic surfactants, and alkyl polyglycoside nonionic surfactants. Examples of the amphoteric surfactants include amino acid amphoteric surfactants, betaine amphoteric surfactants, and amine oxide amphoteric surfactants. In particular, anionic surfactants are preferred, and sulfonic acid anionic surfactants are more preferred.

The minimum addition amount of the surfactant is preferably 0.01 parts by mass or more, more preferably 0.1 parts by mass or more, still more preferably 1.1 parts by mass or more, and particularly preferably 2.0 parts by mass or more for each 100 parts by mass of the solids in natural rubber latex. The maximum addition amount of the surfactant is preferably 6.0 parts by mass or less, more preferably 5.0 parts by mass or less, and still more preferably 3.5 parts by mass or less for each 100 parts by mass of the solids in natural rubber latex. The addition amount of the surfactant of less than 0.01 parts by mass may lead to destabilization of natural rubber latex during the saponification. Conversely, the addition amount of the surfactant of more than 6.0 parts by mass may excessively stabilize natural rubber latex, making it difficult for the latex to coagulate. The addition amount of the surfactant of 1.1 parts by mass or more can lead to further reduction of the phosphorus, nitrogen, and gel contents in the modified natural rubber.

The temperature during the saponification can be appropriately set within a range that allows the saponification with an alkali to proceed at a sufficient reaction rate, and within a range that does not cause alteration of natural rubber latex such as coagulation. Generally, the temperature during the saponification is preferably 20° C. to 70° C., and more preferably 30° C. to 70° C. Further, the period of the saponification in the case of allowing natural rubber latex to stand still is preferably 3 to 48 hours, and more preferably 3 to 24 hours in terms both of sufficient saponification and improvement in productivity. It is to be noted that the length of the period depends on the temperature during the saponification.

In Methods 1 and 2, the pH adjustment after saponification may be performed, for example, by addition of an acid such as formic acid.

In the pH adjustment, the pH is preferably adjusted to 3.0 or higher, and more preferably 3.5 or higher. Also, the pH is preferably adjusted to 5.0 or lower, and more preferably 4.5 or lower. The pH adjustment in the above range allows sufficient removal of sodium and potassium by crushing of the agglomerated rubber and washing of the crushed rubber in Method 1. In Method 2, the above pH adjustment allows formation of agglomerates (coagula) in a desired size by addition of a polymer flocculant, and then sodium and potassium are sufficiently removed in the subsequent washing.

In Method 1, the agglomerated rubber resulting from the pH adjustment is crushed. In Method 2, on the other hand, rubber particles are agglomerated by a polymer flocculant after the pH adjustment. These treatments each enable to adjust the size of the agglomerated rubber to be washed to a small size, so that sodium and potassium are efficiently and sufficiently removed in the subsequent washing.

In the crushing of the agglomerated rubber in Method 1, a known crusher or shredder may be used to crush the agglomerates resulting from the pH adjustment. Examples of the crusher include hammer crushers (hammer mills), and examples of the shredder include plastic shredders. In particular, crushers are preferably used because the agglomerates containing water can be finely crushed.

The crushed agglomerates preferably have an average agglomerate size of 2.0 cm or less, and more preferably 1.0 cm or less. The average agglomerate size of more than 2.0 cm may cause inefficient and insufficient removal of sodium and potassium. The lower limit of the average agglomerate size is not particularly limited, and the average agglomerate size is preferably 3 mm or more, and more preferably 5 mm or more. The average agglomerate size of less than 3 mm may cause a loss in continuous treatments because of too small agglomerates. The average agglomerate size herein refers to the average value of the longest diameter of 100 pieces of the crushed agglomerates.

In Method 2, the step of agglomerating rubber particles by a polymer flocculant allows finer agglomeration (coagulation) of the rubber agglomerated by the pH adjustment, so that the aggregate size becomes smaller compared with that resulting from the crushing step in Method 1. Therefore, sodium and potassium can be more efficiently and sufficiently removed. Here, the polymer flocculant is added preferably with stirring because the agglomerate size (coagulum size) becomes still smaller.

Examples of the polymer flocculant usable in Method 2 include cationic polymer flocculants such as polymers of a dimethylaminoethyl (meth)acrylate methyl chloride quaternary salt, anionic polymer flocculants such as acrylate polymers, nonionic polymer flocculants such as acrylamide polymers, amphoteric polymer flocculants such as copolymers of a dimethylaminoethyl (meth)acrylate methyl chloride quaternary salt and an acrylate. In particular, in terms of efficient agglomeration of natural rubber latex that is stabilized by negative charges, the polymer flocculant is preferably a cationic polymer fluocculant, more preferably a poly(meth) acrylate ester cationic polymer fluocculant (e.g. polymers of a dimethylaminoethyl (meth)acrylate methyl chloride quaternary salt), and still more preferably a polymer of a dimethylaminoethyl (meth)acrylate methyl chloride quaternary salt. Any strong, medium, or weak cationic polymer flocculants may be used. In particular, the polymer flocculant is preferably a strong cationic polymer flocculant.

The minimum addition amount of the polymer flocculant is preferably 0.05 parts by mass or more, more preferably 0.1 parts by mass or more, and still more preferably 0.2 parts by mass or more for each 100 parts by mass of the solids in natural rubber latex. The addition amount of less than 0.05 parts by mass may be insufficient, resulting in partial agglomeration. The maximum addition amount is preferably 5 parts by mass or less, more preferably 3 parts by mass or less, and still more preferably 1 part by mass or less. The addition amount of more than 5 parts by mass may lead to an excessively large amount of the flocculant adsorbed on one particle. In such a case, the particles may be dispersed by interparticle repulsion, failing to form agglomerates.

The agglomerates (coagula) after the crushing or addition of the polymer flocculant preferably has a permeability through a sieve with an opening of 5.6 mm (ASTM E11 No. 3-1/2) of 70% by mass or more, more preferably 80% by mass or more, and still more preferably 85% by mass or more. The permeability of less than 70% by mass may cause a failure to efficiently and sufficiently remove sodium and potassium. The upper limit of the permeability is not particularly limited.

The permeability of the agglomerates (coagula) through the sieve being 70% by mass means that of 100% by mass of the sieved agglomerates (coagula), 70% by mass of the agglomerates (coagula) pass through the sieve and 30% by mass of the agglomerates (coagula) remain on the sieve.

The permeability can be determined by a method mentioned in later-described examples.

In Methods 1 and 2, the agglomerates (coagula (coagulated rubber)) resulting from the crushing or addition of the polymer flocculant are then washed. The washing is not particularly limited, provided that the agglomerates can be washed until the phosphorus content falls to not more than a specific value and the total content of sodium and potassium falls to not more than a predetermined value.

An exemplary method of washing includes the steps of: adding water to the rubber fraction (the agglomerates (coagula)); suspending the rubber fraction in water with stirring for a predetermined period; and then performing solid-liquid separation to recover the rubber fraction. The solid-liquid separation may be performed utilizing the difference in specific gravity between the rubber fraction and water. More specifically, after suspension of the rubber fraction in water, the suspension fluid may be allowed to stand still for a predetermined period, and the water that has a larger specific gravity than the rubber fraction may be removed from the bottom of the vessel. Alternatively, centrifugation may be conducted. Before the centrifugation, dilution with water may first be performed so that the rubber fraction of the natural rubber latex accounts for 5% to 40% by mass, and preferably 10% to 30% by mass. Next, the diluted rubber mixture may be centrifuged for 1 to 60 minutes at 1000 to 10000 rpm. This washing treatment may be repeated until the phosphorous content falls to not more than a specific value and the total content of sodium and potassium falls to not more than a predetermined value. To reduce the phosphorus content to not more than a specific value and also reduce the total content of sodium and potassium to not more than a predetermined value, the washing treatment is preferably repeated.

After the completion of washing, a saponified natural rubber latex is obtained. Then, the saponified natural rubber latex is dried to give the modified natural rubber (HPNR) of the first aspect of the present invention.

In the above production method, the saponification, washing, and drying are preferably completed within 15 days, more preferably within 10 days, and still more preferably within 5 days after natural rubber latex is collected. This is because the gel fraction increases if the latex is left for more than 15 days without being solidified after collection.

(Rubber Composition)

The rubber composition of the first aspect of the present invention contains a vulcanizing agent in addition to the above modified natural rubber (HPNR). Examples of the vulcanizing agent include sulfur, organic peroxides, and thiurams.

The addition amount of the vulcanizing agent is preferably 0.1 parts by mass or more, more preferably 0.5 parts by mass or more, and still more preferably 1.2 parts by mass or more for each 100 parts by mass of the rubber component. The addition amount of less than 0.1 parts by mass may not result in a sufficient degree of crosslinking. The addition amount of the vulcanizing agent is preferably 5.0 parts by mass or less, more preferably 3.0 parts by mass or less, and still more preferably 2.0 parts by mass or less. The addition amount of more than 5.0 parts by mass may result in an excessively high degree of crosslinking, deteriorating physical properties of the vulcanizate.

The rubber composition of the first aspect of the present invention may optionally contain, in addition to the above components, additives conventionally used in the rubber industry such as inorganic or organic fillers such as carbon black, stearic acid, zinc oxide, various antioxidants, softeners such as wax and oil, and vulcanization accelerators, as appropriate.

Examples of the carbon black include, but not limited to, GPF, FEF, HAF, ISAF, and SAF. Addition of carbon black enhances reinforcement.

The carbon black preferably has a nitrogen adsorption specific surface area ($N_2SA$) of 80 $m^2/g$ or more, more preferably 100 $m^2/g$ or more, and still more preferably 120 $m^2/g$ or more.

The $N_2SA$ of less than 80 $m^2/g$ tends to result in lower abrasion resistance. The carbon black preferably has a $N_2SA$ of 280 $m^2/g$ or less, and more preferably 160 $m^2/g$ or less. The $N_2SA$ of more than 280 $m^2/g$ tends to decrease the dispersibility, thereby lowering the abrasion resistance.

The nitrogen adsorption specific surface area of carbon black herein can be determined in accordance with the method A described in JIS K6217.

The dibutyl phthalate (DBP) oil absorption of the carbon black is preferably 70 ml/100 g or more, more preferably 90 ml/100 g or more, and still more preferably 100 ml/100 g or more. The DBP oil absorption of less than 70 ml/100 g may not result in enough reinforcement of the rubber vulcanizate. Also, the DBP oil absorption of the carbon black is preferably 160 ml/100 g or less, more preferably 120 ml/100 g or less, and still more preferably 115 ml/100 g or less. The DBP oil absorption of more than 160 ml/100 g may lead to an increase in the viscosity of the unvulcanized rubber composition, which may lower the processability.

The DBP oil absorption of carbon black herein can be determined in accordance with the measuring method described in JIS K6217-4.

In the case of adding carbon black, the addition amount of the carbon black is preferably 20 parts by mass or more, and more preferably 30 parts by mass or more for each 100 parts by mass of the rubber component. The addition amount of less than 20 parts by mass may not provide enough reinforcement owing to carbon black. The addition amount is preferably 100 parts by mass or less, more preferably 80 parts by mass or less, and still more preferably 70 parts by mass or less. The addition amount of more than 100 parts by mass may deteriorate the dispersibility of filler and may lower the fuel economy.

The vulcanization accelerator is not particularly limited, and examples thereof include N-tert-butyl-2-benzothiazolylsulfenamide, N-cyclohexyl-2-benzothiazolylsulfenamide, and N,N'-diphenylguanidine. In particular, N-tert-butyl-2-benzothiazolylsulfenamide is preferred because the effects of the first aspect of the present invention are sufficiently exerted.

The rubber composition of the first aspect of the present invention can be produced by a usual method. Specifically, for example, the above ingredients are mixed with an apparatus such as a Banbury mixer, kneader, or open roll mill, and are then vulcanized, whereby the rubber composition is produced.

The rubber composition of the first aspect of the present invention can be suitably used for various tire components such as treads and sidewalls, as well as belts, rolls, and the like.

(Pneumatic Tire)

The pneumatic tire of the first aspect of the present invention can be produced using the above rubber composition by a usual method.

Specifically, an unvulcanized rubber composition containing the above ingredients is extruded and processed into the shape of a tire component (e.g. tread), and then assembled with other tire components and molded in a usual manner on a tire building machine to produce an unvulcanized tire. The unvulcanized tire is then subjected to heat and pressure in a vulcanizer, and thereby the pneumatic tire can be produced.

Second Aspect of the Present Invention (Modified Natural Rubber)

The modified natural rubber (HPNR) of the second aspect of the present invention has a phosphorus content of not more than a specific value and a nitrogen content of not more than a predetermined value.

In the second aspect of the present invention, natural rubber latex is saponified with an alkali (e.g. sodium hydroxide, potassium hydroxide) so that the protein, gel, and phospholipid contents are reduced. As a result, the value of tan δ can be reduced. The saponified rubber is then treated with an alkali metal carbonate so that the protein content is further greatly reduced, which in turn results in further reduction in tan δ. Having such a greatly reduced tan δ, the modified natural rubber (HPNR) of the second aspect of the present invention is excellent in reducing the heat build-up and rolling resistance.

In general, since natural rubber (e.g. TSR) has a higher Mooney viscosity than synthetic rubber and has poor processability, a peptizer is usually added to natural rubber and then masticated so as to reduce the Mooney viscosity before use. In contrast, owing to the reduced contents of proteins, gel fraction, and phospholipids, HPNR has a low Mooney viscosity and excellent processability. HPNR is therefore sufficiently mixed without the special step of mastication, which prevents lowering of rubber physical properties (e.g. rubber strength) due to mastication. Accordingly, since HPNR can maintain rubber physical properties that natural rubber originally has, good rubber strength (breaking properties) and abrasion resistance can be obtained. Consequently, it is possible to improve the fuel economy and abrasion resistance in a balanced manner while achieving excellent processability (productivity).

The modified natural rubber (HPNR) of the second aspect of the present invention has a phosphorus content of 200 ppm or less. The phosphorus content of more than 200 ppm tends to result in an increase in the gel content during storage, thereby increasing the value of tan δ of the rubber vulcanizate. In such a case, the fuel economy and abrasion resistance cannot be improved in a balanced manner. The phosphorus content is preferably 150 ppm or less, and more preferably 130 ppm or less. The phosphorus content herein can be determined by a conventional method such as ICP optical emission spectrometry. It is to be noted that the phosphorus is derived from phospholipids (phosphorus compounds).

The modified natural rubber of the second aspect of the present invention preferably has a gel content of 20% by mass or less, more preferably 15% by mass or less, and still more preferably 12% by mass or less. The gel content of more than 20% by mass tends to result in lower processability such as increased Mooney viscosity. In addition, the fuel economy and abrasion resistance may not be improved in a balanced manner. It is to be noted that the gel content is similarly defined as in the first aspect of the present invention.

The modified natural rubber of the second aspect of the present invention preferably contains substantially no phospholipids.

The modified natural rubber of the second aspect of the present invention has a nitrogen content of 0.2% by mass or less, preferably 0.1% by mass or less, and more preferably 0.08% by mass or less. The nitrogen content of more than 0.2% by mass results in a failure to improve the fuel economy and abrasion resistance in a balanced manner. In addition, the Mooney viscosity increases during storage. Here, the nitrogen is derived from proteins. The nitrogen content can be determined by a conventional method such as the Kjeldahl method.

The modified natural rubber of the second aspect of the present invention preferably has a total content of sodium and potassium of 350 ppm or less, more preferably 300 ppm or less, still more preferably 250 ppm or less, and particularly preferably 200 ppm or less. The total content of sodium and potassium of not more than 350 ppm (predetermined value) allows sufficient removal of sodium and potassium derived from the alkali used in saponification. In this case, the value of tan δ is more favorably reduced.

The total content of sodium and potassium herein can be determined by measuring the sodium content and the potassium content by a conventional method such as ICP optical emission spectrometry and then summing up the results.

An exemplary method for producing the modified natural rubber of the second aspect of the present invention includes the steps of: saponifying natural rubber latex with an alkali; adjusting pH of the saponified natural rubber latex; treating the rubber resulting from the pH adjustment, with an alkali metal carbonate; and washing the treated rubber. More specifically, the following methods 1 and 2 may be mentioned.

(Method 1)

A method including the steps of: saponifying natural rubber latex with an alkali; adjusting pH of the saponified natural rubber latex; crushing the agglomerated rubber resulting from the pH adjustment; treating the crushed rubber with an alkali metal carbonate; and washing the treated rubber until the phosphorus content in rubber falls to not more than a specific value.

(Method 2)

A method including the steps of: saponifying natural rubber latex with an alkali; adjusting pH of the saponified natural rubber latex; agglomerating rubber particles by a polymer flocculant after the pH adjustment; treating the agglomerated rubber with an alkali metal carbonate; and washing the treated rubber until the phosphorus content in rubber falls to not more than a specific value.

According to the above methods, phosphorus compounds separated by saponification are removed by washing, so that the modified natural rubber is allowed to have a lowered phosphorus content, thereby leading to reduction in tan δ. The saponification also decomposes proteins in the modified natural rubber, so that the modified natural rubber is allowed to have a lowered nitrogen content, thereby leading to further reduction in tan δ. In addition, after the pH adjustment of the saponified natural rubber latex (or agglomeration of rubber with acid), neutralization of the remaining acid with an alkali metal carbonate further reduces the nitrogen content in rubber, resulting in further reduction in tan δ. Also, excellent abrasion resistance is secured.

In Methods 1 and 2, the saponification can be performed by adding an alkali and optionally a surfactant to natural rubber latex and allowing the mixture to stand still for a certain period at a predetermined temperature. Here, the mixture may optionally be stirred or subjected to other operations. According to the above methods, phosphorus compounds separated by saponification are removed by washing, and therefore the phosphorus content of the modified natural rubber is reduced. In addition, the saponification and treatment with an alkali metal carbonate decompose proteins in the modified natural rubber, and therefore the nitrogen content of the modified natural rubber is reduced. In the second aspect of the present invention, the saponification is performed by adding an alkali to natural rubber latex, and the addition of an alkali to natural rubber latex contributes to efficient saponification.

Natural rubber latex is sap collected from hevea trees and contains components such as water, proteins, lipids, and inorganic salts as well as a rubber fraction. A gel fraction in rubber is thought to be derived from a complex of various impurities in rubber. In the second aspect of the present invention, the same kinds of natural rubber latex as used in the first aspect of the present invention may be used.

Examples of the alkali used in saponification include sodium hydroxide, potassium hydroxide, calcium hydroxide, and amine compounds. Especially, sodium hydroxide or potassium hydroxide is preferably used from the standpoint of the saponification effects and the influence on the stability of natural rubber latex.

In the saponification, the addition amount of the alkali is not particularly limited, and the minimum amount is preferably 0.1 parts by mass or more, and more preferably 0.3 parts by mass or more for each 100 parts by mass of the solids in natural rubber latex. The maximum addition amount is preferably 12 parts by mass or less, more preferably 10 parts by mass or less, still more preferably 7 parts by mass or less, and particularly preferably 5 parts by mass or less. The addition amount of the alkali of less than 0.1 parts by mass may require a long time for saponification. Conversely, the addition amount of the alkali of more than 12 parts by mass may destabilize natural rubber latex.

The same surfactants as used in the first aspect of the present invention may be favorably used.

The minimum addition amount of the surfactant is preferably 0.01 parts by mass or more, more preferably 0.1 parts by mass or more, still more preferably 0.5 parts by mass or more, particularly preferably 1.1 parts by mass or more, and most preferably 2.0 parts by mass or more for each 100 parts by mass of the solids in natural rubber latex. The maximum addition amount is preferably 6.0 parts by mass or less, more preferably 5.0 parts by mass or less, and still more preferably 3.5 parts by mass or less. The addition amount of the surfactant of less than 0.01 parts by mass may lead to destabilization of natural rubber latex during the saponification. Conversely, the addition amount of the surfactant of more than 6.0 parts by mass may excessively stabilize natural rubber latex, making it difficult for the latex to coagulate. The addition amount of 1.1 parts by mass or more can lead to further reduction of the phosphorus, nitrogen, and gel contents in the modified natural rubber.

The temperature during the saponification can be appropriately set within a range that allows the saponification with an alkali to proceed at a sufficient reaction rate, and within a range that does not cause alteration of natural rubber latex such as coagulation. Generally, the temperature during the saponification is preferably 20° C. to 70° C., and more preferably 30° C. to 70° C. Further, the period of the saponification in the case of allowing natural rubber latex to stand still is preferably 3 to 48 hours, and more preferably 3 to 24 hours in terms both of sufficient saponification and improvement in productivity. It is to be noted that the length of the period depends on the temperature during the saponification.

In Methods 1 and 2, the pH adjustment after saponification may be performed, for example, by addition of an acid such as formic acid.

In the pH adjustment, the pH is preferably adjusted to 3.0 or higher, and more preferably 3.5 or higher. Also, the pH is preferably adjusted to 5.0 or lower, and more preferably 4.5 or lower. The pH adjustment in the above range allows sufficient removal of proteins by the subsequent treatment with an alkali metal carbonate in Method 1. In Method 2, the pH adjustment allows formation of agglomerates (coagula) in a desired size by addition of a polymer flocculant, and then proteins are sufficiently removed in the subsequent treatment with an alkali metal carbonate.

In Method 1, the agglomerated rubber resulting from the pH adjustment is crushed. In Method 2, on the other hand, rubber particles are agglomerated by a polymer flocculant after the pH adjustment. These treatments each enable to adjust the size of the agglomerated rubber to be subjected to a treatment with an alkali metal carbonate to a small size, so that proteins are efficiently and sufficiently removed in that treatment.

In Method 1, the agglomerated rubber may be crushed by the same method as employed in the first aspect of the present invention.

The crushed agglomerates preferably have an average agglomerate size of 2.0 cm or less, and more preferably 1.0 cm or less. The average agglomerate size of more than 2.0 cm may result in a failure to efficiently and sufficiently remove proteins. The lower limit of the average agglomerate size is not particularly limited, and the average agglomerate size is preferably 3 mm or more, and more preferably 5 mm or more. The average agglomerate size of less than 3 mm may cause a loss in continuous treatments because of too small agglomerates. Here, the average agglomerate size indicates the average value of the longest diameter of 100 pieces of the crushed agglomerates measured.

In Method 2, the step of agglomerating rubber particles by a polymer flocculant allows finer agglomeration (coagulation) of the rubber agglomerated by the pH adjustment, so that the aggregate size becomes smaller compared with that resulting from the crushing step in Method 1. Therefore, proteins can be more efficiently and sufficiently removed. Here, the polymer flocculant is added preferably with stirring because the agglomerate size (coagulum size) becomes still smaller.

The same polymer flocculants as used in the first aspect of the present invention may be favorably used in Method 2.

The minimum addition amount of the polymer flocculant is preferably 0.05 parts by mass or more, more preferably 0.1 parts by mass or more, and still more preferably 0.2 parts by mass or more for each 100 parts by mass of the solids in natural rubber latex. The addition amount of less than 0.05 parts by mass may be insufficient, resulting in partial agglomeration. The maximum addition amount is preferably 5 parts by mass or less, more preferably 3 parts by mass or less, and still more preferably 1 part by mass or less. The addition amount of more than 5 parts by mass may lead to an excessively large amount of the flocculant adsorbed on one particle. In such a case, the particles may be dispersed by interparticle repulsion, failing to form agglomerates.

The agglomerates (coagula) after the crushing or addition of the polymer flocculant preferably has a permeability through a sieve with an opening of 5.6 mm (ASTM E11 No. 3-1/2) of 70% by mass or more, more preferably 80% by mass or more, still more preferably 85% by mass or more, and particularly preferably 90% by mass or more. The permeability of less than 70% by mass may cause a failure to efficiently and sufficiently remove proteins. The upper limit of the permeability is not particularly limited.

The permeability of the agglomerates (coagula) through the sieve being 70% by mass means that of 100% by mass of the sieved agglomerates (coagula), 70% by mass of the agglomerates (coagula) pass through the sieve and 30% by mass of the agglomerates (coagula) remain on the sieve.

The permeability can be determined by a method mentioned in later-described examples.

In Methods 1 and 2, the agglomerates (coagula (coagulated rubber)) resulting from the crushing or addition of the polymer flocculant is then brought into contact with an alkali metal carbonate for the treatment with an alkali metal carbonate.

A method of the treatment with an alkali metal carbonate is not particularly limited, provided that the rubber is made in contact with an alkali metal carbonate. An exemplary method includes immersing the agglomerates in an aqueous alkali metal carbonate solution.

Examples of the alkali metal carbonate include sodium carbonate, sodium hydrogen carbonate, potassium carbonate, potassium hydrogen carbonate, lithium carbonate, and lithium hydrogen carbonate. In particular, sodium carbonate or potassium carbonate is preferred in that the effects of the second aspect of the present invention are larger.

In the case where the treatment with an alkali metal carbonate is carried out by immersing as above, the rubber (agglomerates) can be immersed in an aqueous alkali solution preferably having a concentration of 0.1% to 5% by mass, and more preferably 0.2% to 3% by mass. This further reduces the contents of nitrogen and the like in rubber.

In the case where the treatment with an alkali metal carbonate is carried out by the immersing, the temperature of the alkali treatment may be appropriately determined. In general, it is preferably 20° C. to 70° C., and more preferably 25° C. to 70° C. The period of the alkali treatment is, though it also depends on the treatment temperature, preferably 3 to 10 hours, and more preferably 3 to 7 hours from both the standpoint of enough treatment and productivity.

In Methods 1 and 2, the agglomerates (coagulated rubber) treated with the alkali metal carbonate is then washed. The washing treatment is not particularly limited, provided that the rubber can be washed until the phosphorus content falls to not more than a specific value. The washing treatment is preferably performed until the phosphorus content falls to not more than a specific value and the total content of sodium and potassium falls to not more than a predetermined value.

An exemplary washing treatment includes: adding water to the rubber fraction (agglomerates (coagula) treated with the alkali metal carbonate); suspending the rubber fraction in water with stirring for a predetermined period; and performing solid-liquid separation to recover the rubber fraction. The solid-liquid separation may be performed utilizing the difference in specific gravity between the rubber fraction and water. More specifically, after suspension of the rubber fraction in water, the suspension fluid may be allowed to stand still for a predetermined period, and water that has a larger specific gravity than the rubber fraction may be removed from the bottom of the vessel. Or alternatively, centrifugation may be conducted. The centrifugation allows efficient separation of even ultra-fine rubber particles. Before the centrifugation, dilution with water may first be performed so that the rubber fraction of the natural rubber latex accounts for 5% to 40% by mass, and preferably 10% to 30% by mass. Next, the diluted rubber mixture may be centrifuged for 1 to 60 minutes at about 1000 to 10000 rpm. This washing treatment may be repeated until the phosphorus content in rubber falls to not more than a specific value (preferably until the phosphorous content falls to not more than a specific value and the total content of sodium and potassium falls to not more than a predetermined value). To reduce the phosphorus content to not more than a specific value (or to reduce the phosphorus content to not more than a specific value, and also reduce the total content of sodium and potassium to not more than a predetermined value), the washing treatment is preferably repeated. After the completion of washing, the resulting matter is dried to give the modified natural rubber (HPNR) of the second aspect of the present invention.

In the above production method, the process of saponification to drying is preferably completed within 15 days, more preferably within 10 days, and still more preferably within 5 days after natural rubber latex is collected. This is because the gel fraction increases if the latex is left for more than 15 days without being solidified after collection.

(Rubber Composition)

The rubber composition of the second aspect of the present invention contains a vulcanizing agent in addition to the above modified natural rubber (HPNR). Examples of the vulcanizing agent include sulfur, organic peroxides, and thiurams.

The addition amount of the vulcanizing agent is preferably 0.1 parts by mass or more, more preferably 0.5 parts by mass or more, and still more preferably 1.2 parts by mass or more for each 100 parts by mass of the rubber component. The addition amount of less than 0.1 parts by mass may not result in a sufficient degree of crosslinking. The addition amount is preferably 5.0 parts by mass or less, more preferably 3.0 parts by mass or less, and still more preferably 2.0 parts by mass or less. The addition amount of more than 5.0 parts by mass may result in an excessively high degree of crosslinking, deteriorating physical properties of the vulcanizate.

The rubber composition of the second aspect of the present invention may optionally contain, in addition to the above components, additives conventionally used in the rubber industry such as inorganic or organic fillers such as carbon black, stearic acid, zinc oxide, various antioxidants, softeners such as wax and oil, and vulcanization accelerators, as appropriate.

The same kinds of carbon black as used in the first aspect of the present invention may be favorably used.

The carbon black preferably has a nitrogen adsorption specific surface area ($N_2SA$) of 80 $m^2/g$ or more, more preferably 100 $m^2/g$ or more, and still more preferably 120 $m^2/g$ or more.

The $N_2SA$ of less than 80 $m^2/g$ tends to result in lower abrasion resistance. The carbon black preferably has a $N_2SA$ of 280 $m^2/g$ or less, and more preferably 160 $m^2/g$ or less. The $N_2SA$ of more than 280 $m^2/g$ tends to decrease the dispersibility, thereby lowering the abrasion resistance.

The nitrogen adsorption specific surface area of carbon black herein can be determined in accordance with the method A described in JIS K6217.

The dibutyl phthalate (DBP) oil absorption of the carbon black is preferably 70 ml/100 g or more, more preferably 90 ml/100 g or more, and still more preferably 100 ml/100 g or more. The DBP oil absorption of less than 70 ml/100 g may not result in enough reinforcement of the rubber vulcanizate. Also, the DBP oil absorption of the carbon black is preferably 160 ml/100 g or less, more preferably 120 ml/100 g or less, and still more preferably 115 ml/100 g or less. The DBP oil absorption of more than 160 ml/100 g may lead to an increase in the viscosity of the unvulcanized rubber composition, which may lower the processability.

The DBP oil absorption of carbon black herein can be determined in accordance with the measuring method described in JIS K6217-4.

In the case of adding carbon black, the addition amount of the carbon black is preferably 20 parts by mass or more, and more preferably 30 parts by mass or more for each 100 parts by mass of the rubber component. The addition amount of less than 20 parts by mass may not provide enough reinforcement owing to carbon black. The addition amount is preferably 100 parts by mass or less, more preferably 80 parts by mass or less, and still more preferably 70 parts by mass or less. The addition amount of more than 100 parts by mass may deteriorate the dispersibility of filler and may lower the fuel economy.

The vulcanization accelerator is not particularly limited, and the same vulcanization accelerators as used in the first aspect of the present invention may be favorably used. In particular, N-tert-butyl-2-benzothiazolylsulfenamide is preferred because the effects of the second aspect of the present invention are sufficiently exerted.

The rubber composition of the second aspect of the present invention can be produced by the same usual method as employed in the first aspect of the present invention.

The rubber composition of the second aspect of the present invention can be suitably used for various tire components such as treads and sidewalls, as well as belts, rolls, and the like.

(Pneumatic Tire)

The pneumatic tire of the second aspect of the present invention can be produced using the above rubber composition by the same usual method as employed in the first aspect of the present invention.

EXAMPLES

The present invention is now specifically described based on examples, but the present invention is not limited to these examples.

Examples of the First Aspect of the Present Invention

Chemicals used in Examples 1 to 8 and Comparative Examples 1 and 2 are listed below.
Natural rubber latex: field latex obtained from Thaitex
Emal-E: surfactant produced by Kao Corporation (sodium polyoxyethylene lauryl ether sulfate)
NaOH: NaOH produced by Wako Pure Chemical Industries, Ltd.
Formic acid: formic acid produced by Wako Pure Chemical Industries, Ltd.
ARONFLOC C312: strong cationic polymer flocculant (polymethacrylate ester) produced by MT AquaPolymer, Inc.

Preparation of Saponified Natural Rubber (Modified Natural Rubber) Treated with Alkali Example 1

After natural rubber latex was adjusted to have a solid content concentration (DRC) of 30% (w/v), Emal-E (10 g) and NaOH (20 g) were added to the natural rubber latex (1000 g), and the mixture was subjected to a saponification reaction at ambient temperature for 48 hours. Thus, a saponified natural rubber latex was obtained. Water was added to dilute the latex to the DRC of 15% (w/v). Formic acid was then added thereto with slow stirring to adjust the pH to 4.0 to 4.5 so that the latex was agglomerated. The agglomerated rubber was treated with a hammer mill manufactured by Natural rubber machine & equipments, and then finely divided (crushed) using a rubber granulator. The crushed agglomerates (agglomerated rubber) had an average agglomerate size of 5 mm.

Next, the crushed agglomerates (agglomerated rubber) were washed. In this washing treatment, water (1000 ml) was first added to the crushed agglomerates (agglomerated rubber), and the rubber fraction was suspended in water with stirring for 10 minutes. The suspension fluid was then allowed to stand still for 60 minutes. After that, water was removed from the bottom of the vessel. The washing treatment was repeated for three times and the resulting matter was dried at 110° C. for 2 hours to give a solid rubber (modified natural rubber).

Examples 2 to 5

Solid rubbers (modified natural rubbers) were obtained in the same manner as in Example 1, except for the number of washing treatments. The crushed agglomerates (agglomerated rubbers) obtained in Examples 2 to 5 each had an average agglomerate size of 5 mm.

Example 6

After natural rubber latex was adjusted to have a solid content concentration (DRC) of 30% (w/v), Emal-E (10 g) and NaOH (20 g) were added to the natural rubber latex (1000 g), and the mixture was subjected to a saponification reaction at ambient temperature for 48 hours. Thus, a saponified natural rubber latex was obtained. Water was added to dilute the latex to the DRC of 15% (w/v). Formic acid was then added thereto with slow stirring to adjust the pH to 4.0 to 4.5. After the pH adjustment, a polymer flocculant (ARONFLOC C312, 1 g) in the form of a 0.1% solution was added thereto with stirring so that the latex was agglomerated.

The agglomerates (agglomerated rubber) were then washed in the same manner as in Example 1. The washing treatment was repeated for four times and the resulting matter was dried at 110° C. for 2 hours to give a solid rubber (modified natural rubber).

Examples 7 and 8

Solid rubbers (modified natural rubbers) were obtained in the same manner as in Example 6, except for the number of washing treatments.

Comparative Example 1

A solid rubber (natural rubber) was obtained in the same manner as in Example 1, except that the washing treatment was not performed. The crushed agglomerates (agglomerated rubber) obtained in Comparative Example 1 had an average agglomerate size of 5 mm.

Comparative Example 2

A solid rubber (natural rubber) was obtained in the same manner as in Example 1, except for the number of washing treatments. The crushed agglomerates (agglomerated rubber) obtained in Comparative Example 2 had an average agglomerate size of 5 mm.

With regard to the solid rubbers obtained in Examples 1 to 8 and Comparative Examples 1 and 2, the nitrogen content, phosphorus content, gel content, and total content of sodium and potassium were determined by the following methods. The permeability through a sieve with an opening of 5.6 mm (ASTM E11 No. 3-1/2) was also determined with regard to the agglomerates (coagula) (the crushed agglomerates in the case of crushing, or the agglomerates resulting from the addition of a polymer flocculant in the case where the polymer flocculant was added) obtained in Examples 1 to 8 and Comparative Examples 1 and 2. Table 1 shows the results.

(Determination of the Nitrogen Content)

The nitrogen content was determined by using CHN CORDER MT-5 (produced by Yanaco Analytical Instruments Corp.). For determination of the nitrogen content, a calibration curve was first prepared by using antipyrine as a reference material. Then, about 10 mg of the obtained natural rubber was weighed out, and the average value of three measurements was determined as the nitrogen content of the sample.

(Determination of the Phosphorus Content)

The phosphorus content was determined by using an ICP optical emission spectrometer (ICPS-8100, produced by Shimadzu Corp.).

The $^{31}$P-NMR measurement of phosphorus was performed as follows. A chloroform extract from raw rubber was purified and then dissolved in $CDCl_3$ to prepare a test sample. The test sample was analyzed using an NMR spectrometer (400 MHz, AV400M, produced by Bruker Japan Co., Ltd.) based on the standard (0 ppm) that was the determined peak corresponding to the P atom of an 80% aqueous phosphoric acid solution.

(Determination of the Gel Content)

An amount of 70.00 mg of a raw rubber sample cut in a size of 1 mm×1 mm was weighed out, and then was mixed with 35 mL of toluene and allowed to stand still for one week in a cool and dark place. Next, the mixture was centrifuged so that a toluene-insoluble gel fraction was precipitated, and a toluene-soluble supernatant was removed. The gel fraction alone was solidified with methanol and then dried. The mass of the dried gel fraction was measured, and then used in the following formula to determine the gel content (%):

Gel content (% by mass)=[Mass after drying (mg)/ Initial mass of the sample (mg)]×100.

(Determination of the Total Content of Sodium and Potassium)

The total content of sodium and potassium was determined by using an ICP optical emission spectrometer (ICPS-8100, produced by Shimadzu Corp.).

(Determination of the Permeability Through a Sieve)

The permeability of the agglomerates (coagula) (the crushed agglomerates in the case of crushing, or the agglomerates resulting from the addition of a polymer flocculant in the case where the polymer flocculant was added) obtained in each example through a sieve with an opening of 5.6 mm (ASTM E11 No. 3-1/2) was determined by the following method.

In the case of the crushed agglomerated rubber, the crushed agglomerates were immersed in water and stored before use in the test, to prevent the rubber agglomerates from further agglomerating one another due to their drying. On the other hand, the rubber particles agglomerated with the flocculant were mixed with water so that only the ratio of the rubber particles to water was adjusted before use in the test. Both the agglomerates were adjusted so that the mass ratio of rubber to the total of rubber and water was 10% by mass before use in the test.

About 100 g of the rubber dispersion was weighed under thorough stirring and poured onto a sieve with an opening of 5.6 mm. The sieve was shaken at a rate of 60 reciprocations per minute with an amplitude of about 70 mm. Separation was performed until the rubber did not pass through the sieve any more, while a 1% surfactant solution was continuously poured to prevent agglomeration of the rubber. The rubber having passed through the sieve and the rubber remaining on the sieve were each dried. The permeability was calculated using the following equation:

Permeability=(mass of the rubber having passed)/
[(mass of the rubber having passed)+(mass of the rubber remaining on the sieve)]×100.

mixed with a 1.7 L Banbury mixer manufactured by KOBE STEEL, LTD. at 150° C. for 5 minutes to give a kneaded mixture. To the obtained kneaded mixture were added the sulfur and vulcanization accelerator, and the resulting mixture was kneaded with an open roll mill at 80° C. for 5 minutes to give an unvulcanized rubber composition. The unvulcanized rubber composition was press-vulcanized at 170° C. for 20 minutes to give a vulcanized rubber composition. In Examples 9 to 16, the solid rubbers (HPNR) obtained in Examples 1 to 8 were respectively used. In Comparative Examples 3 and 4, the solid rubbers obtained in Comparative Examples 1 and 2 were respectively used.

TABLE 1

|  | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|
| Washing treatment | Washed | Washed | Washed | Washed | Washed | Washed | Washed | Washed | Not washed | Washed |
| The number of washing treatments | 3 | 4 | 5 | 6 | 7 | 4 | 5 | 6 | — | 1 |
| Phosphorus content (ppm) | 121 | 116 | 117 | 116 | 115 | 98 | 95 | 93 | 430 | 298 |
| Total content of sodium and potassium (ppm) | 321 | 280 | 247 | 233 | 178 | 249 | 218 | 198 | 837 | 512 |
| Nitrogen content (% by mass) | 0.14 | 0.13 | 0.13 | 0.12 | 0.10 | 0.13 | 0.13 | 0.11 | 0.26 | 0.20 |
| Gel content (% by mass) | 13 | 14 | 11 | 10 | 10 | 15 | 13 | 12 | 22 | 20 |
| Permeability through the sieve (% by mass) | 78 | 77 | 78 | 76 | 79 | 87 | 86 | 86 | 77 | 75 |

As shown in Table 1, the natural rubbers (modified natural rubbers) in Examples 1 to 8 each had a reduced phosphorus content, total content of sodium and potassium, nitrogen content, and gel content compared with the natural rubber (unwashed) of Comparative Example 1 and the natural rubber (insufficiently washed) of Comparative Example 2.

In the $^{31}$P-NMR measurement of extracts from the natural rubbers of Examples 1 to 8, no phospholipid peak between −3 ppm and 1 ppm was detected. In contrast, in the $^{31}$P-NMR measurement of extracts from the natural rubbers of Comparative Examples 1 and 2, phospholipid peaks between −3 ppm and 1 ppm were detected.

Chemicals used in Examples 9 to 16 and Comparative Examples 3 and 4 are listed below.
Natural rubbers: solid rubbers obtained in Examples 1 to 8 and Comparative Examples 1 and 2
Carbon black: SHOBLACK N110 produced by Cabot Japan K.K. ($N_2$SA: 143 m$^2$/g, DBP: 113 ml/100 g)
Antioxidant: NOCRAC 6C (N-(1,3-dimethylbutyl)-N'-phenyl-p-phenylenediamine) produced by Ouchi Shinko Chemical Industrial Co., Ltd.
Stearic acid: stearic acid produced by NOF CORPORATION
Zinc oxide: zinc oxide #1 produced by Mitsui Mining & Smelting Co., Ltd.
Sulfur: sulfur powder produced by Tsurumi Chemical Industry Co., Ltd.
Vulcanization accelerator: NOCCELER NS (N-tert-butyl-2-benzothiazolylsulfenamide) produced by Ouchi Shinko Chemical Industrial Co., Ltd.

Examples 9 to 16 and Comparative Examples 3 and 4

According to the formulation shown in Table 2, ingredients other than the sulfur and vulcanization accelerator were The obtained vulcanized rubber compositions were evaluated as follows. Table 2 shows the test results.
(Viscoelasticity Test)
With regard to the obtained vulcanized rubber compositions, the loss tangent (tan δ) of the composition of each formulation was determined using a viscoelasticity spectrometer VES (produced by Iwamoto Seisakusho Co., Ltd.) under the following conditions: temperature of 50° C., initial strain of 10%, dynamic strain of 2%, and frequency of 10 Hz. The tan δ was expressed as an index relative to the tan δ of Comparative Example 3 as a standard (=100) by using the following equation. A larger index value indicates a lower tan δ and better fuel economy.

(tan δ index)=(tan δ of Comparative Example 3)/(tan δ of each formulation)×100

(Abrasion Resistance)
The Lambourn abrasion loss of the vulcanized rubber composition of each formulation was determined by using a Lambourn abrasion tester under the following conditions: temperature of 20° C., slip ratio of 20%, and test time of 2 minutes. The volume loss was then calculated from the determined Lambourn abrasion loss. The volume loss of each formulation was expressed as an index by using the following equation. The larger the abrasion resistance index, the better the abrasion resistance.

(Abrasion resistance index)=(Volume loss of Comparative Example 3)/(Volume loss of each formulation)×100

TABLE 2

|  | Example 9 | Example 10 | Example 11 | Example 12 | Example 13 | Example 14 | Example 15 | Example 16 | Comparative Example 3 | Comparative Example 4 |
|---|---|---|---|---|---|---|---|---|---|---|
| Natural rubber | 100 | 100 | 100 | 100 | 100 | 100 | 100 | 100 | 100 | 100 |
| Carbon black | 50 | 50 | 50 | 50 | 50 | 50 | 50 | 50 | 50 | 50 |
| Antioxidant | 1 | 1 | 1 | 1 | 1 | 1 | 1 | 1 | 1 | 1 |
| Stearic acid | 3 | 3 | 3 | 3 | 3 | 3 | 3 | 3 | 3 | 3 |
| Zinc oxide | 3 | 3 | 3 | 3 | 3 | 3 | 3 | 3 | 3 | 3 |
| Sulfur | 1.5 | 1.5 | 1.5 | 1.5 | 1.5 | 1.5 | 1.5 | 1.5 | 1.5 | 1.5 |
| Vulcanization accelerator | 0.8 | 0.8 | 0.8 | 0.8 | 0.8 | 0.8 | 0.8 | 0.8 | 0.8 | 0.8 |
| tan δ index | 113 | 115 | 118 | 120 | 121 | 116 | 117 | 120 | 100 | 102 |
| Abrasion resistance index | 112 | 113 | 113 | 112 | 113 | 115 | 115 | 116 | 100 | 103 |

Table 2 shows that a reduced tan δ and better abrasion resistance were achieved in Examples in which a natural rubber (modified natural rubber) having a phosphorus content of not more than a specific value and a total content of sodium and potassium of not more than a predetermined value was used. Comparison between Examples 9 to 13 and between Examples 14 to 16 demonstrated that the smaller the total content of sodium and potassium is, the more the value of tan δ is reduced.

Examples of the Second Aspect of the Present Invention

Chemicals used in Examples 17 to 24 and Comparative Examples 5 and 6 are listed below.
Natural rubber latex: field latex obtained from Thaitex
Emal-E: surfactant produced by Kao Corporation (sodium polyoxyethylene lauryl ether sulfate)
NaOH: NaOH produced by Wako Pure Chemical Industries, Ltd.
Formic acid: formic acid produced by Wako Pure Chemical Industries, Ltd.
ARONFLOC C312: strong cationic polymer flocculant (polymethacrylate ester) produced by MT AquaPolymer, Inc.
Sodium carbonate: sodium carbonate produced by Wako Pure Chemical Industries, Ltd.
Potassium carbonate: potassium carbonate produced by Wako Pure Chemical Industries, Ltd.

Preparation of Saponified Natural Rubber (Modified Natural Rubber) Treated with Alkali Example 17

After natural rubber latex was adjusted to have a solid content concentration (DRC) of 30% (w/v), Emal-E (10 g) and NaOH (20 g) were added to the natural rubber latex (1000 g), and the mixture was subjected to a saponification reaction at ambient temperature for 48 hours. Thus, a saponified natural rubber latex was obtained. Water was added to dilute the latex to the DRC of 15% (w/v). Formic acid was then added thereto with slow stirring to adjust the pH to 4.0 to 4.5 so that the latex was agglomerated. The agglomerated rubber is treated with a hammer mill manufactured by Natural rubber machine & equipments, and then finely divided (crushed) using a rubber granulator. The crushed agglomerates (agglomerated rubber) had an average agglomerate size of 5 mm.

Next, the crushed agglomerates (agglomerated rubber) were immersed in a 0.1% aqueous sodium carbonate solution for 10 hours at ambient temperature, and then removed from the solution and repeatedly washed with 1000 ml of water. The resulting matter was dried at 90° C. for 4 hours to give a solid rubber (modified natural rubber).

Examples 18 to 22

Solid rubbers (modified natural rubbers) were obtained in the same manner as in Example 17, except that the kind and/or concentration of an alkali metal carbonate was/were changed in accordance with Table 3. The crushed agglomerates (agglomerated rubbers) obtained in Examples 18 to 22 each had an average agglomerate size of 5 mm.

Example 23

After natural rubber latex was adjusted to have a solid content concentration (DRC) of 30% (w/v), Emal-E (10 g) and NaOH (20 g) were added to the natural rubber latex (1000 g), and the mixture was subjected to a saponification reaction at ambient temperature for 48 hours. Thus, a saponified natural rubber latex was obtained. Water was added to dilute the latex to the DRC of 15% (w/v). Formic acid was then added thereto with slow stirring to adjust the pH to 4.0 to 4.5. After the pH adjustment, a polymer flocculant (ARONFLOC C312, 1 g) in the form of a 0.1% solution was added thereto with stirring so that the latex was agglomerated.

Next, the agglomerates (agglomerated rubber) were immersed in a 0.5% aqueous sodium carbonate solution for 5 hours at ambient temperature, and then removed from the solution and repeatedly washed with 1000 ml of water. The resulting matter was dried at 90° C. for 4 hours to give a solid rubber (modified natural rubber).

Example 24

A solid rubber (modified natural rubber) was obtained in the same manner as in Example 23, except that the concentration of the alkali metal carbonate solution was changed.

Comparative Example 5

After natural rubber latex was adjusted to have a solid content concentration (DRC) of 30% (w/v), Emal-E (10 g) and NaOH (20 g) were added to the natural rubber latex (1000 g), and the mixture was subjected to a saponification reaction at ambient temperature for 48 hours. Thus, a saponified natural rubber latex was obtained. Water was added to dilute the latex to the DRC of 15% (w/v). Formic acid was then added thereto with slow stirring to adjust the pH to 4.0 to 4.5 so that the latex was agglomerated. The agglomerated rubber is treated with a hammer mill manufactured by Natural rubber machine & equipments, and then finely divided (crushed)

using a rubber granulator. The crushed agglomerates (agglomerated rubber) had an average agglomerate size of 5 mm.

Then, the crushed agglomerates (agglomerated rubber) were repeatedly washed with 1000 ml of water and then dried at 90° C. for 4 hours to give a solid rubber (natural rubber).

Comparative Example 6

After natural rubber latex was adjusted to have a solid content concentration (DRC) of 30% (w/v), Emal-E (10 g) and NaOH (20 g) were added to the natural rubber latex (1000 g), and the mixture was subjected to a saponification reaction at ambient temperature for 48 hours. Thus, a saponified natural rubber latex was obtained. Water was added to dilute the latex to the DRC of 15% (w/v). Formic acid was then added thereto with slow stirring to adjust the pH to 4.0 to 4.5. After the pH adjustment, a polymer flocculant (ARONFLOC C312, 1 g) in the form of a 0.1% solution was added thereto with stirring so that the latex was agglomerated.

Then, the agglomerates (agglomerated rubber) were repeatedly washed with 1000 ml of water and then dried at 90° C. for 4 hours to give a solid rubber (natural rubber).

With regard to the solid rubbers obtained in Examples 17 to 24 and Comparative Examples 5 and 6, the nitrogen content, phosphorus content, and gel content were determined. The permeability through a sieve with an opening of 5.6 mm (ASTM E11 No. 3-1/2) was also determined with regard to the agglomerates (coagula) (the crushed agglomerates in the case of crushing, or the agglomerates resulting from the addition of a polymer flocculant in the case where the polymer flocculant was added) obtained in Examples 17 to 24 and Comparative Examples 5 and 6. Table 3 shows the results.

The same methods as used in the case of the solid rubbers obtained in Examples 1 to 8 and Comparative Examples 1 and 2 were used for determining the nitrogen content, phosphorus content, gel content, and permeability through the sieve.

Carbon black: SHOBLACK N110 produced by Cabot Japan K.K. ($N_2SA$: 143 $m^2$/g, DBP: 113 ml/100 g)
Antioxidant: NOCRAC 6C (N-(1,3-dimethylbutyl)-N'-phenyl-p-phenylenediamine) produced by Ouchi Shinko Chemical Industrial Co., Ltd.
Stearic acid: stearic acid produced by NOF CORPORATION
Zinc oxide: zinc oxide #1 produced by Mitsui Mining & Smelting Co., Ltd.
Sulfur: sulfur powder produced by Tsurumi Chemical Industry Co., Ltd.
Vulcanization accelerator: NOCCELER NS (N-tert-butyl-2-benzothiazolylsulfenamide) produced by Ouchi Shinko Chemical Industrial Co., Ltd.

Examples 25 to 32 and Comparative Examples 7 and 8

According to the formulation shown in Table 4, ingredients other than the sulfur and vulcanization accelerator were mixed with a 1.7 L Banbury mixer manufactured by KOBE STEEL, LTD. at 150° C. for 5 minutes to give a kneaded mixture. To the obtained kneaded mixture were added the sulfur and vulcanization accelerator, and the resulting mixture was kneaded with an open roll mill at 80° C. for 5 minutes to give an unvulcanized rubber composition. The unvulcanized rubber composition was press-vulcanized at 170° C. for 20 minutes to give a vulcanized rubber composition. In Examples 25 to 32, the solid rubbers (HPNR) obtained in Examples 17 to 24 were respectively used. In Comparative Examples 7 and 8, the solid rubbers obtained in Comparative Examples 5 and 6 were respectively used.

The obtained unvulcanized rubber compositions and vulcanized rubber compositions were evaluated as follows. Table 4 shows the test results.

TABLE 3

| | Example 17 | Example 18 | Example 19 | Example 20 | Example 21 | Example 22 | Example 23 | Example 24 | Comparative Example 5 | Comparative Example 6 |
|---|---|---|---|---|---|---|---|---|---|---|
| Kind of alkali | $Na_2CO_3$ | $Na_2CO_3$ | $Na_2CO_3$ | $Na_2CO_3$ | $K_2CO_3$ | $K_2CO_3$ | $Na_2CO_3$ | $Na_2CO_3$ | Not used | Not used |
| Alkali concentration (% by mass) | 0.1 | 0.3 | 0.5 | 2 | 0.3 | 1 | 0.5 | 2 | — | — |
| Phosphorus content (ppm) | 124 | 120 | 121 | 121 | 130 | 124 | 118 | 112 | 125 | 123 |
| Nitrogen content (% by mass) | 0.15 | 0.11 | 0.09 | 0.07 | 0.12 | 0.09 | 0.08 | 0.06 | 0.25 | 0.23 |
| Gel content (% by mass) | 14 | 16 | 15 | 12 | 15 | 13 | 11 | 12 | 21 | 23 |
| Permeability through the sieve (% by mass) | 72 | 74 | 76 | 73 | 74 | 72 | 88 | 91 | 73 | 88 |

As shown in Table 3, the natural rubbers (modified natural rubbers) of Examples 17 to 24 each had a greatly reduced nitrogen content compared with the natural rubbers (not treated with an alkali metal carbonate) of Comparative Examples 5 and 6.

In the $^{31}$P-NMR measurement of extracts from the natural rubbers of Examples 17 to 24 and Comparative Examples 5 and 6, no phospholipid peak between −3 ppm and 1 ppm was detected.

Chemicals used in Examples 25 to 32 and Comparative Examples 7 and 8 are listed below.
Natural rubbers: solid rubbers obtained in Examples 17 to 24 and Comparative Examples 5 and 6

(Viscoelasticity Test)
With regard to the obtained vulcanized rubber compositions, the loss tangent (tan δ) of the composition of each formulation was determined under the same conditions as employed in examples of the first aspect of the present invention. The tan δ was expressed as an index relative to the tan δ of Comparative Example 7 as a standard (=100) by using the following equation. A larger index value indicates a lower tan δ and better fuel economy.

(tan δ index)=(tan δ of Comparative Example 7)/(tan δ of each formulation)×100

(Abrasion Resistance)
The Lambourn abrasion loss of the vulcanized rubber composition of each formulation was determined under the same conditions as those used in examples of the first aspect of the present invention. The volume loss was then calculated from the determined Lambourn abrasion loss. The volume loss of each formulation was expressed as an index by using the following equation. A larger abrasion resistance index indicates better abrasion resistance.

(Abrasion resistance index)=(Volume loss of Comparative Example 7)/(Volume loss of each formulation)×100

(Processability)

The Mooney viscosity ($ML_{1+4}$) of each obtained unvulcanized rubber composition was determined at 130° C. by a method for determining the Mooney viscosity in accordance with JIS K 6300 and was evaluated based on the following criteria:

Good: Mooney viscosity of less than 60;
Average: Mooney viscosity of 60 to 70;
Poor: Mooney viscosity of more than 70.

The rating of "Good" indicates that the Mooney viscosity is low and the processability is excellent, and the rating of "Average" or "Poor" indicates that the Mooney viscosity is high and the processability is inferior.

TABLE 4

|  | Example 25 | Example 26 | Example 27 | Example 28 | Example 29 | Example 30 | Example 31 | Example 32 | Comparative Example 7 | Comparative Example 8 |
|---|---|---|---|---|---|---|---|---|---|---|
| Natural rubber | 100 | 100 | 100 | 100 | 100 | 100 | 100 | 100 | 100 | 100 |
| Carbon black | 50 | 50 | 50 | 50 | 50 | 50 | 50 | 50 | 50 | 50 |
| Antioxidant | 1 | 1 | 1 | 1 | 1 | 1 | 1 | 1 | 1 | 1 |
| Stearic acid | 3 | 3 | 3 | 3 | 3 | 3 | 3 | 3 | 3 | 3 |
| Zinc oxide | 3 | 3 | 3 | 3 | 3 | 3 | 3 | 3 | 3 | 3 |
| Sulfur | 1.5 | 1.5 | 1.5 | 1.5 | 1.5 | 1.5 | 1.5 | 1.5 | 1.5 | 1.5 |
| Vulcanization accelerator | 0.8 | 0.8 | 0.8 | 0.8 | 0.8 | 0.8 | 0.8 | 0.8 | 0.8 | 0.8 |
| tan δ index | 105 | 106 | 112 | 113 | 104 | 112 | 114 | 116 | 100 | 101 |
| Abrasion resistance index | 100 | 101 | 101 | 100 | 101 | 101 | 101 | 102 | 100 | 100 |
| Processability | Good | Good | Good | Good | Good | Good | Good | Good | Average | Average |

Table 4 shows that the value of tan δ was reduced in Examples in which a natural rubber (modified natural rubber) having a phosphorus content of not more than a specific value and a nitrogen content of not more than a predetermined value was used. In addition, the abrasion resistance was excellent in such Examples. Comparison between Examples 25 to 28, between Examples 29 and 30, and between Examples 31 and 32 demonstrated that the smaller the nitrogen content is, the more the value of tan δ is reduced.

The invention claimed is:

1. A modified natural rubber having
a phosphorus content of 200 ppm or less and
a total content of sodium and potassium of 350 ppm or less.

2. The modified natural rubber according to claim 1, having a nitrogen content of 0.3% by mass or less and a gel content of 20% by mass or less, the gel content being determined as an amount of toluene-insoluble matter.

3. The modified natural rubber according to claim 1, wherein the modified natural rubber is produced by a method comprising the steps of:
saponifying natural rubber latex with an alkali; and
washing the resulting rubber until the phosphorus content falls to 200 ppm or less and the total content of sodium and potassium falls to 350 ppm or less.

4. The modified natural rubber according to claim 1, wherein the modified natural rubber is produced by a method comprising the steps of:
saponifying natural rubber latex with an alkali;
adjusting pH of the saponified natural rubber latex;
crushing the agglomerated rubber resulting from the pH adjustment so that the crushed agglomerates have an average agglomerate size of 2.0 cm or less; or
agglomerating rubber particles by a polymer flocculant after the pH adjustment; and
washing the crushed rubber or the rubber agglomerated by the polymer flocculant until the phosphorus content falls to 200 ppm or less and the total content of sodium and potassium falls to 350 ppm or less.

5. A method for producing a modified natural rubber, comprising the steps of:
saponifying natural rubber latex with an alkali; and
washing the resulting rubber until the phosphorus content falls to 200 ppm or less and the total content of sodium and potassium falls to 350 ppm or less.

6. The method for producing a modified natural rubber according to claim 5, comprising the steps of:
saponifying natural rubber latex with an alkali;
adjusting pH of the saponified natural rubber latex;
crushing the agglomerated rubber resulting from the pH adjustment so that the crushed agglomerates have an average agglomerate size of 2.0 cm or less; or
agglomerating rubber particles by a polymer flocculant after the pH adjustment; and
washing the crushed rubber or the rubber agglomerated by the polymer flocculant until the phosphorus content falls to 200 ppm or less and the total content of sodium and potassium falls to 350 ppm or less.

7. A rubber composition comprising the modified natural rubber according to claim 1, and a vulcanizing agent.

8. A pneumatic tire produced using the rubber composition according to claim 7.

9. A modified natural rubber having
a phosphorus content of 200 ppm or less and
a nitrogen content of 0.2% by mass or less.

10. The modified natural rubber according to claim 9, having a nitrogen content of 0.1% by mass or less.

11. The modified natural rubber according to claim 9, having a gel content of 20% by mass or less, the gel content being determined as an amount of toluene-insoluble matter.

12. The modified natural rubber according to claim 9, wherein the modified natural rubber shows no phospholipid peak between −3 ppm and 1 ppm in a $^{31}$P-NMR measurement of a chloroform extract thereof and thus contains substantially no phospholipids.

13. The modified natural rubber according to claim 9, wherein the modified natural rubber is produced by a method comprising the steps of:
- saponifying natural rubber latex with an alkali;
- adjusting pH of the saponified natural rubber latex;
- treating the rubber resulting from the pH adjustment with an alkali metal carbonate; and
- washing the treated rubber.

14. A method for producing a modified natural rubber, comprising the steps of:
- saponifying natural rubber latex with an alkali;
- adjusting pH of the saponified natural rubber latex;
- treating the rubber resulting from the pH adjustment with an alkali metal carbonate; and
- washing the treated rubber until the phosphorus content falls to 200 ppm or less.

15. A rubber composition comprising the modified natural rubber according to claim 9, and a vulcanizing agent.

16. A pneumatic tire produced using the rubber composition according to claim 15.

* * * * *